(12) United States Patent
Hong

(10) Patent No.: US 11,641,311 B2
(45) Date of Patent: May 2, 2023

(54) BACKHAUL BANDWIDTH ADJUSTING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/759,687

(22) PCT Filed: Nov. 3, 2017

(86) PCT No.: PCT/CN2017/109263
§ 371 (c)(1),
(2) Date: Apr. 27, 2020

(87) PCT Pub. No.: WO2019/084900
PCT Pub. Date: May 9, 2019

(65) Prior Publication Data
US 2020/0336382 A1    Oct. 22, 2020

(51) Int. Cl.
*H04L 41/0896* (2022.01)
*H04W 8/24* (2009.01)
(Continued)

(52) U.S. Cl.
CPC ......... *H04L 41/0896* (2013.01); *H04W 8/245* (2013.01); *H04W 16/04* (2013.01); *H04W 88/14* (2013.01)

(58) Field of Classification Search
CPC .. H04L 41/0896; H04W 16/04; H04W 88/14; H04W 8/245
See application file for complete search history.

(56) References Cited

U.S. PATENT DOCUMENTS

| | | | |
|---|---|---|---|
| 6,404,738 B1 * | 6/2002 | Reininger | H04L 47/783 370/465 |
| 2007/0110004 A1 * | 5/2007 | Liu | H04W 72/0486 370/335 |

(Continued)

FOREIGN PATENT DOCUMENTS

| | | |
|---|---|---|
| CN | 101009612 A | 8/2007 |
| CN | 103888981 A | 6/2014 |

(Continued)

OTHER PUBLICATIONS

WIPO English Version of International Search Report in Application No. PCT/CN2017/109263, dated Jul. 24, 2018.
(Continued)

*Primary Examiner* — Stephen J Clawson
(74) *Attorney, Agent, or Firm* — Syncoda LLC; Feng Ma

(57) ABSTRACT

A backhaul bandwidth adjusting method includes: acquiring the amount of the data to be transmitted of each access device in a first time window, the access device including access user equipment and a wireless backhaul base station; and determining, on the basis of the amount of the data to be transmitted of each access device in the first time window and a wired backhaul bandwidth, an available backhaul bandwidth allocated for each wireless backhaul base station in the next first time window. As such, a wired backhaul base station can allocate to a wireless backhaul base station reasonable bandwidths of an uplink backhaul link and a downlink backhaul link on the basis of the amount of the data to be transmitted of the connected wireless backhaul base station, such that spectrum resources can be used more effectively.

5 Claims, 9 Drawing Sheets

(51) Int. Cl.
*H04W 16/04* (2009.01)
*H04W 88/14* (2009.01)

(56) References Cited

U.S. PATENT DOCUMENTS

| | | | | |
|---|---|---|---|---|
| 2008/0090575 | A1* | 4/2008 | Barak | H04W 28/18 455/444 |
| 2014/0126358 | A1 | 5/2014 | Bedekar et al. | |
| 2014/0335877 | A1 | 11/2014 | Roberts et al. | |
| 2015/0124607 | A1 | 5/2015 | Kotecha | |
| 2016/0095107 | A1* | 3/2016 | Negus | H04L 45/02 370/280 |

FOREIGN PATENT DOCUMENTS

| | | | |
|---|---|---|---|
| CN | 104507167 | A | 4/2015 |
| CN | 106162817 | A | 11/2016 |
| CN | 106572480 | A | 4/2017 |
| CN | 106686607 | A | 5/2017 |

OTHER PUBLICATIONS

Extended European Search Report in Application No. 17930924.0, dated Mar. 25, 2021.
CN 1st Office Action in Application No. 201780001844.X, dated Apr. 13, 2021.

\* cited by examiner

BACKHAUL BANDWIDTH ADJUSTING METHOD AND APPARATUS

CROSS-REFERENCE TO RELATED APPLICATION

This application is a national stage of International Application No. PCT/CN2017/109263 filed on Nov. 3, 2017, the disclosure of which is hereby incorporated by reference in its entirety.

TECHNICAL FIELD

The present disclosure relates to the technical field of communication, and particularly, relates to a backhaul bandwidth adjusting method and apparatus.

BACKGROUND

In research and discussion of the 5th Generation (5G for short) mobile communication technology project, in order to meet requirements of more diversified services, higher rates, and greater numbers of connections, 5G networks need to significantly improve frequency spectrum efficiency. Due to transmission characteristics of high frequency bands, base stations using high frequency bands transmission are generally small cells. If each small cell is configured with a traditional wired backhaul link, such as an optical fiber link, then the cost is high and the deployment of backhaul links is complicated. In order to reduce deployment complexity of backhaul links, in the research and discussion of the 5G project, an integrated fronthaul and backhaul solution is proposed, that is, both the data transmission between a wireless backhaul base station and a user equipment (UE for short) and the data transmission between a base station and a core network use the same wireless communication system protocol to perform transmission through a wireless link.

A wireless connection of a wireless backhaul small cell may be established through a base station with a wired backhaul capability, and then the wireless backhaul small cell realizes wireless backhaul through a base station with a wired backhaul capability. A new wireless backhaul implementation solution for a 5G system needs to be proposed, to ensure that a wired backhaul base station may allocate a reasonable backhaul bandwidth for each wireless backhaul base station.

SUMMARY

In order to overcome problems in the related art, embodiments of the present disclosure provide a backhaul bandwidth adjusting method and apparatus, for realizing that a wired backhaul base station may allocate reasonable bandwidths of an uplink backhaul link and a downlink backhaul link for a wireless backhaul base station on the basis of the amount of data to be transmitted of a connected wireless backhaul base station, so that frequency spectrum resources are used relatively effectively.

According to a first aspect of embodiments of the present disclosure, a backhaul bandwidth adjusting method is provided, applied to a wired backhaul base station, the method including:

acquiring an amount of data to be transmitted of each access device in a first time window, the access device including an accessed user equipment and a wireless backhaul base station; and determining, on the basis of the amount of data to be transmitted of each access device in the first time window and a wired backhaul bandwidth, an available backhaul bandwidth allocated for each wireless backhaul base station in a next first time window.

In an embodiment, the acquiring the amount of data to be transmitted of each access device in the first time window includes:

receiving an amount of uplink data to be transmitted reported by each access device in the first time window.

In an embodiment, the determining, on the basis of the amount of data to be transmitted of each access device in the first time window and the wired backhaul bandwidth, the available backhaul bandwidth allocated for each wireless backhaul base station in the next first time window, includes:

determining, on the basis of the amount of uplink data to be transmitted reported by each access device in the first time window, a total amount of uplink data reported by all access devices in the first time window; and determining, on the basis of a ratio of an amount of uplink data to be transmitted reported by each wireless backhaul base station in the first time window to the total amount of uplink data and the wired backhaul bandwidth, an uplink available backhaul bandwidth of each wireless backhaul base station in the next first time window.

In an embodiment, the acquiring the amount of data to be transmitted of each access device in the first time window includes:

receiving an amount of downlink data to be transmitted of each user equipment sent by a core network device in a first time window; and determining, on the basis of the amount of downlink data to be transmitted of each user equipment and a base station accessed by each user equipment, an amount of downlink data to be transmitted of each access device in a first time window.

In an embodiment, the determining, on the basis of the amount of data to be transmitted of each access device in the first time window and the wired backhaul bandwidth, the available backhaul bandwidth allocated for each wireless backhaul base station in the next first time window includes:

determining, on the basis of the amount of downlink data to be transmitted of each access device in a first time window, a total amount of downlink data to be transmitted of all access devices in the first time window; and determining, on the basis of a wired backhaul bandwidth and a ratio of an amount of downlink data to be transmitted of each wireless backhaul base station in a first time window to the total amount of downlink data, a downlink available backhaul bandwidth of each wireless backhaul base station.

According to a second aspect of embodiments of the present disclosure, a backhaul bandwidth adjusting method is provided, applied to a wireless backhaul base station, the method including:

acquiring an amount of uplink data to be transmitted reported by each accessed user equipment in a second time window; and reporting, on the basis of the amount of uplink data to be transmitted of each accessed user equipment in the second time window, an amount of uplink data to be transmitted of the wireless backhaul base station in a first time window.

In an embodiment, both the first time window and the second time window are set by a wired backhaul base station accessed by the wireless backhaul base station.

According to a third aspect of embodiments of the present disclosure, a backhaul bandwidth adjusting method is provided, applied to a user equipment, the method including:

determining, on the basis of a base station type of an accessed base station, a time window of reporting an amount of uplink data to be transmitted; and reporting the amount of uplink data to be transmitted to the accessed base station in the time window.

In an embodiment, the determining, on the basis of the base station type of the accessed base station, the time window of reporting the amount of uplink data to be transmitted includes:

Determining, if the base station type of the accessed base station is a base station with a wired backhaul capability, the time window of reporting the amount of uplink data to be transmitted as a first time window; and determining, if the base station type of the accessed base station is a wireless backhaul small cell with a wireless backhaul capability, the time window of reporting the amount of uplink data to be transmitted as a second time window.

In an embodiment, both the first time window and the second time window are set by the wired backhaul base station.

According to a fourth aspect of embodiments of the present disclosure, a backhaul bandwidth adjusting method is provided, applied to a core network device, the method including:

determining an amount of downlink data to be transmitted of each accessed user equipment; and sending an amount of downlink data to be transmitted of a user equipment served by a corresponding base station to each base station with a wired backhaul capability.

According to a fifth aspect of embodiments of the present disclosure, a backhaul bandwidth adjusting apparatus is provided, applied to a wired backhaul base station, the apparatus including:

a first acquiring module, configured to acquire an amount of data to be transmitted of each access device in a first time window, the access device including an accessed user equipment and a wireless backhaul base station; and a first determining module, configured to determine, on the basis of the amount of data to be transmitted of each access device in the first time window acquired by the first acquiring module and a wired backhaul bandwidth, an available backhaul bandwidth allocated for each wireless backhaul base station in a next first time window.

In an embodiment, the first acquiring module includes:

a first receiving sub-module, configured to receive an amount of uplink data to be transmitted reported by each access device in the first time window.

In an embodiment, the first determining module includes:

a first determining sub-module, configured to determine, on the basis of the amount of uplink data to be transmitted reported by each access device in the first time window, a total amount of uplink data reported by all access devices in the first time window; and a second determining sub-module, configured to determine, on the basis of a ratio of an amount of uplink data to be transmitted reported by each wireless backhaul base station in the first time window to the total amount of uplink data and the wired backhaul bandwidth, an uplink available backhaul bandwidth of each wireless backhaul base station in the next first time window.

In an embodiment, the first acquiring module includes:

a second receiving sub-module, configured to receive an amount of downlink data to be transmitted of each user equipment sent by a core network device in a first time window; and a third determining sub-module, configured to determine, on the basis of the amount of downlink data to be transmitted of each user equipment and a base station accessed by each user equipment, an amount of downlink data to be transmitted of each access device in a first time window.

In an embodiment, the first determining module includes:

a fourth determining sub-module, configured to determine, on the basis of the amount of the downlink data to be transmitted of each access device in a first time window, a total amount of downlink data to be transmitted of all access devices in the first time window; and a fifth determining sub-module, configured to determine, on the basis of a wired backhaul bandwidth and a ratio of an amount of downlink data to be transmitted of each wireless backhaul base station in a first time window to the total amount of downlink data, a downlink available backhaul bandwidth of each wireless backhaul base station.

According to a sixth aspect of embodiments of the present disclosure, a backhaul bandwidth adjusting apparatus is provided, applied to a wireless backhaul base station, the apparatus including:

a second acquiring module, configured to acquire an amount of uplink data to be transmitted reported by each accessed user equipment in a second time window; and a first reporting module, configured to report, on the basis of the amount of uplink data to be transmitted of each accessed user equipment in the second time window, an amount of uplink data to be transmitted of the wireless backhaul base station in a first time window.

In an embodiment, both the first time window and the second time window are set by a wired backhaul base station accessed by the wireless backhaul base station.

According to a seventh aspect of embodiments of the present disclosure, a backhaul bandwidth adjusting apparatus is provided, applied to a user equipment, wherein, the apparatus including:

a second determining module, configured to determine, on the basis of a base station type of an accessed base station, a time window of reporting an amount of uplink data to be transmitted; and a second reporting module, configured to report the amount of uplink data to be transmitted to the accessed base station in the time window.

In an embodiment, the second determining module includes:

a sixth determining sub-module, configured to determine, when the base station type of the accessed base station is a base station with a wired backhaul capability, the time window of reporting the amount of uplink data to be transmitted as a first time window; and a seventh determining sub-module, configured to determine, when the base station type of the accessed base station is a wireless backhaul small cell with a wireless backhaul capability, the time window of reporting the amount of uplink data to be transmitted as a second time window.

In an embodiment, both the first time window and the second time window are set by the wired backhaul base station.

According to an eighth aspect of embodiments of the present disclosure, a backhaul bandwidth adjusting apparatus is provided, applied to a core network device, the apparatus including:

a third determining module, configured to determine an amount of downlink data to be transmitted of each accessed user equipment; and a sending module, configured to send an amount of downlink data to be transmitted of a user equipment served by a corresponding base station to each base station with a wired backhaul capability.

According to a ninth aspect of embodiments of the present disclosure, a base station is provided, including:

a processor; and a memory for storing instructions executable by the processor;

where the processor is configured to:

acquire an amount of data to be transmitted of each access device in a first time window, the access device comprising an accessed user equipment and a wireless backhaul base station; and determine, on the basis of the amount of data to be transmitted of each access device in a first time window and a wired backhaul bandwidth, an available backhaul bandwidth allocated for each wireless backhaul base station in a next first time window.

According to a tenth aspect of embodiments of the present disclosure, a base station is provided, including:

a processor; and a memory for storing instructions executable by the processor;

where the processor is configured to:

acquire an amount of uplink data to be transmitted reported by each accessed user equipment in a second time window; and report, on the basis of the amount of uplink data to be transmitted of each accessed user equipment in a second time window, an amount of uplink data to be transmitted of the wireless backhaul base station in a first time window.

According to an eleventh aspect of embodiments of the present disclosure, a user equipment is provided, including:

a processor; and a memory for storing instructions executable by the processor;

where the processor is configured to:

determine, on the basis of a base station type of an accessed base station, a time window of reporting an amount of uplink data to be transmitted; and report the amount of uplink data to be transmitted to the accessed base station in the time window.

According to a twelfth aspect of embodiments of the present disclosure, a core network device is provided, including:

a processor; and a memory for storing instructions executable by the processor;

where the processor is configured to:

determine an amount of downlink data to be transmitted of each accessed user equipment; and send an amount of downlink data to be transmitted of a user equipment served by a corresponding base station to each base station with a wired backhaul capability.

According to a thirteenth aspect of embodiments of the present disclosure, a non-temporary computer-readable storage medium is provided, computer instructions being stored on the storage medium, and when the instructions are executed by a processor, the following operations are implemented:

acquiring an amount of data to be transmitted of each access device in a first time window, the access device including an accessed user equipment and a wireless backhaul base station; and determining, on the basis of the amount of data to be transmitted of each access device in a first time window and a wired backhaul bandwidth, an available backhaul bandwidth allocated for each wireless backhaul base station in a next first time window.

According to a fourteenth aspect of embodiments of the present disclosure, a non-temporary computer-readable storage medium is provided, computer instructions being stored on the storage medium, and when the instructions are executed by a processor, the following operations are implemented:

acquiring an amount of uplink data to be transmitted reported by each accessed user equipment in a second time window; and reporting, on the basis of the amount of uplink data to be transmitted of each accessed user equipment in the second time window, an amount of uplink data to be transmitted of the wireless backhaul base station in a first time window.

According to a fifteenth aspect of embodiments of the present disclosure, a non-temporary computer-readable storage medium is provided, computer instructions being stored on the storage medium, and when the instructions are executed by a processor, the following operations are implemented:

determining, on the basis of a base station type of an accessed base station, a time window of reporting an amount of uplink data to be transmitted; and reporting the amount of uplink data to be transmitted to the accessed base station in the time window.

According to a sixteenth aspect of embodiments of the present disclosure, a non-temporary computer-readable storage medium is provided, computer instructions being stored on the storage medium, and when the instructions are executed by a processor, the following operations are implemented:

determining an amount of downlink data to be transmitted of each accessed user equipment; and sending an amount of downlink data to be transmitted of a user equipment served by a corresponding base station to each base station with a wired backhaul capability.

Technical solutions provided by embodiments of the present disclosure may include the following beneficial effects.

A wired backhaul base station may determine an available backhaul bandwidth allocated for each accessed wireless backhaul base station in a next first time window on the basis of an amount of data to be transmitted of each access device in a first time window, to realize that a wired backhaul base station may allocate reasonable bandwidths of an uplink backhaul link and a downlink backhaul link for a wireless backhaul base station on the basis of an amount of data to be transmitted of connected wireless backhaul base station, and frequency spectrum resources are used relatively effectively.

It should be understood that the above general descriptions and the following detailed descriptions are only exemplary and explanatory, and should not limit the present disclosure.

BRIEF DESCRIPTION OF THE DRAWINGS

The accompanying drawings herein are incorporated in the specification and constitute a part of the specification, illustrate embodiments consistent with the present disclosure, and are used together with the specification to explain principles of the present disclosure.

DETAILED DESCRIPTION

Exemplary embodiments will be described in detail herein, and examples thereof are illustrated in the accompanying drawings. When the following description refers to the accompanying drawings, the same numbers in different accompanying drawings represent the same or similar elements unless otherwise indicated. The embodiments described in the following exemplary embodiments do not represent all embodiments consistent with the present disclosure. On the contrary, they are only examples of apparatuses and methods consistent with some aspects of the present disclosure as detailed in the appended claims.

Figure 1A:
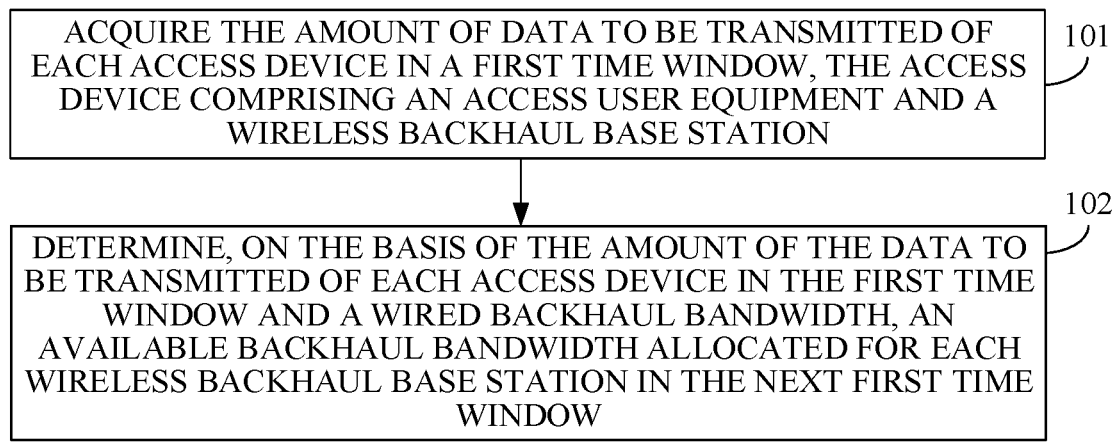
FIG. 1A is a flowchart of a backhaul bandwidth adjusting method illustrated according to an exemplary embodiment.
Figure 1B:
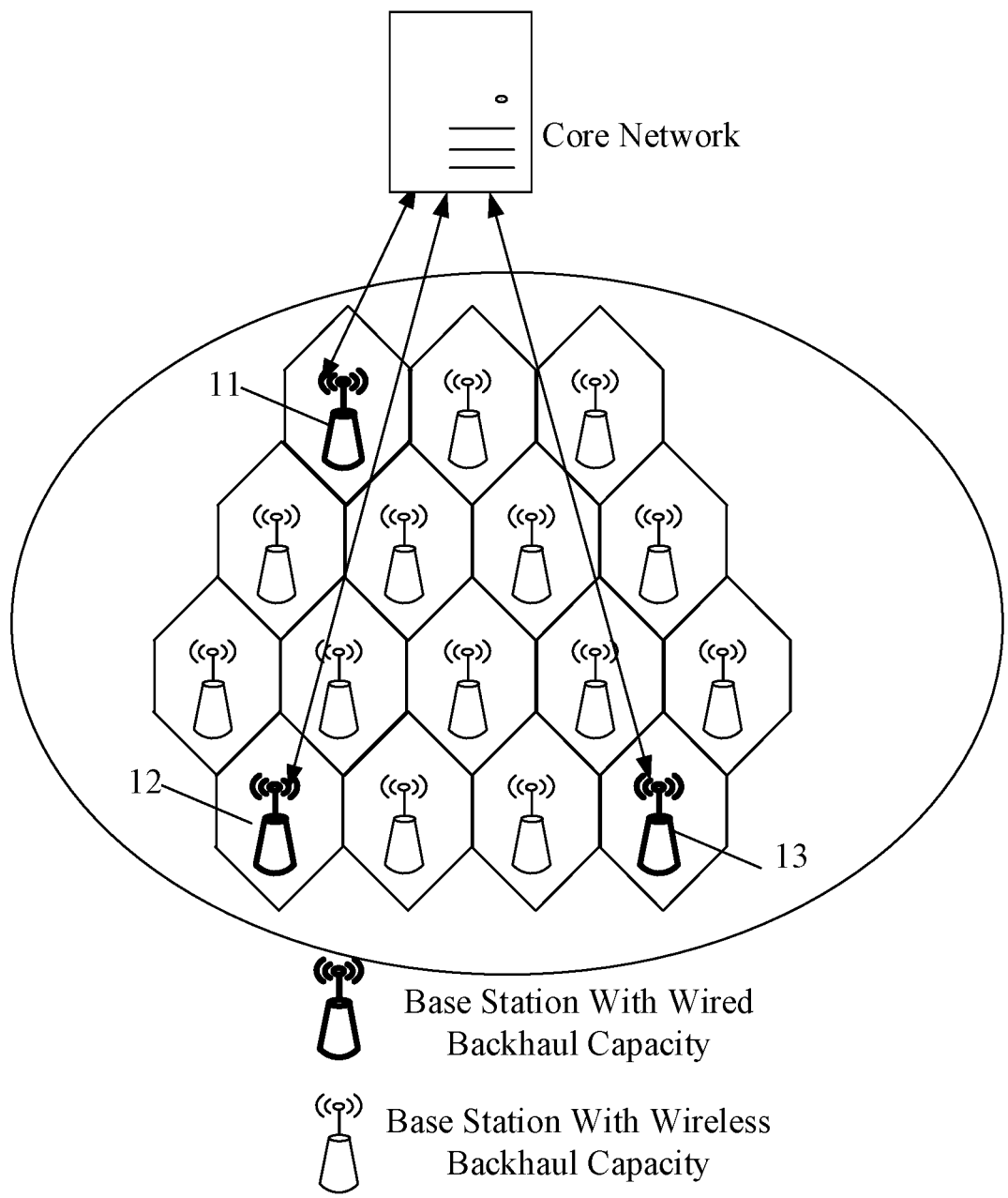
FIG. 1B is a first application scenario chart of a backhaul bandwidth adjusting method according to an exemplary embodiment.

In technical solutions provided by the present disclosure, there may be two types of base stations within the coverage area of a core network, referring to FIG. 1B. In FIG. 1B, there are wired backhaul base stations (which are base stations with a wired backhaul capability) within the coverage area of the core network, such as the base stations indicated by mark 11, mark 12 and mark 13. A wired backhaul link is deployed between a wired backhaul base station and the core network. There are also wireless backhaul base stations (which are base stations with a wireless backhaul capability) within the coverage area of the core network. For example, the base stations are all wireless backhaul base stations except the base stations indicated by mark 11, mark 12 and mark 13. No wired backhaul link is deployed between a wireless backhaul station and the core network, and wired backhaul may not be realized.

Figure 1C:
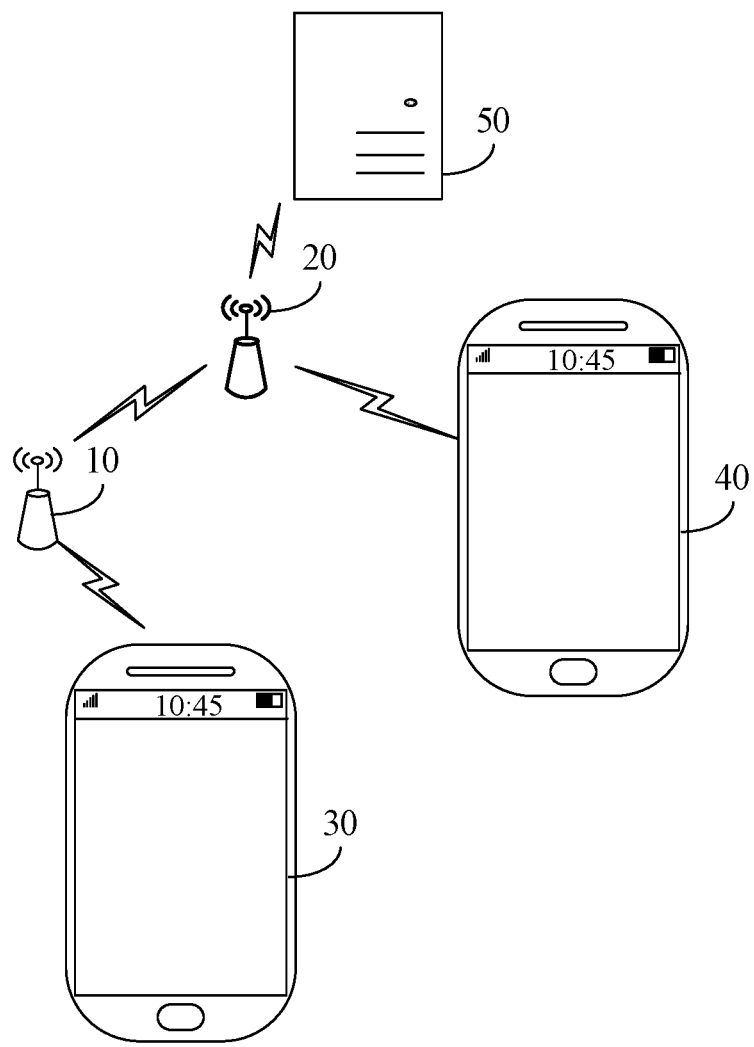
FIG. 1C is a second application scenario chart of a backhaul bandwidth adjusting method according to an exemplary embodiment.

FIG. 1A is a flowchart of a backhaul bandwidth adjusting method illustrated according to an exemplary embodiment, and FIG. 1C is a second application scenario chart of a backhaul bandwidth adjusting method according to an exemplary embodiment. The backhaul bandwidth adjusting method may be applied to a wire-only backhaul base station. As shown in FIG. 1A, the backhaul bandwidth adjusting method includes the following operations 101 to 102.

In operation 101, an amount of data to be transmitted of each access device in a first time window is acquired. The access device includes an accessed user equipment and a wireless backhaul base station.

In an embodiment, the first time window may be set in a wired backhaul base station, and the length of the first time window may be a fixed time, such as 1 ms. The first time window may also be a time unit in a logical sense, such as 1 subframe, 1 slot and the like.

Figure 2:
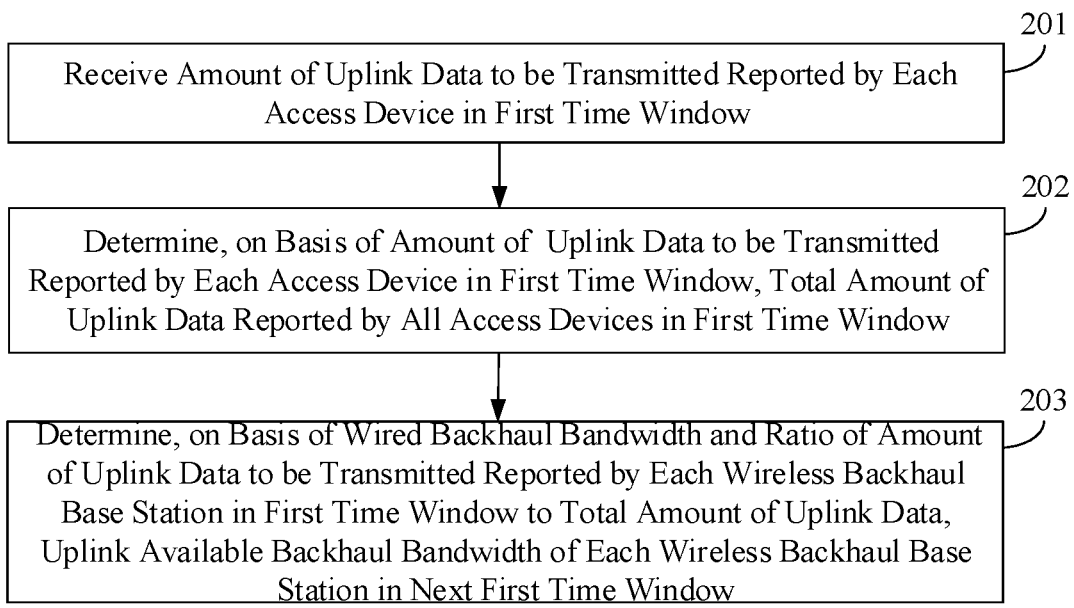
FIG. 2 is a flowchart of another backhaul bandwidth adjusting method illustrated according to an exemplary embodiment.

In an embodiment, the amount of data to be transmitted may include an amount of uplink data to be transmitted, and a method for acquiring an amount of uplink data to be transmitted of each access device in the first time window may refer to the embodiment shown in FIG. 2, and it is not detailed herein.

Figure 3:
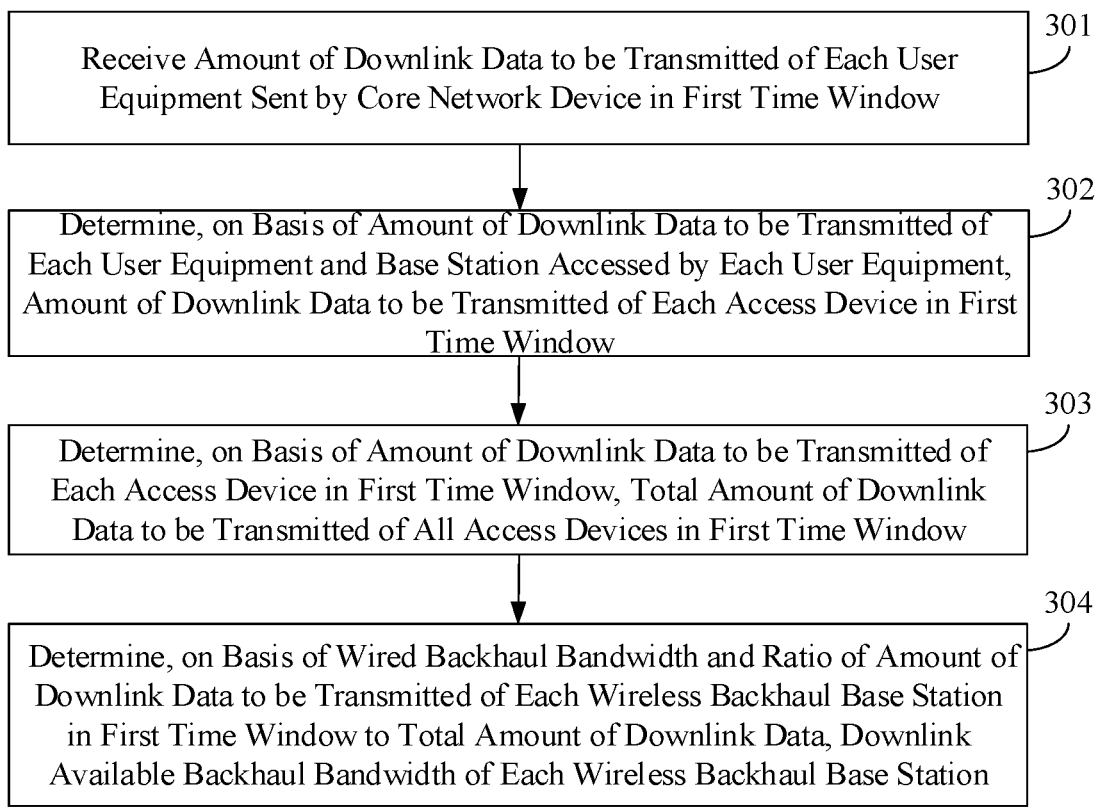
FIG. 3 is a flowchart of one more backhaul bandwidth adjusting method illustrated according to an exemplary embodiment.

In an embodiment, the amount of data to be transmitted may include an amount of uplink data to be transmitted, and a method for acquiring an amount of downlink data to be transmitted of each access device in the first time window may refer to the embodiment shown in FIG. 3, and it is not detailed herein.

In operation 102, an available backhaul bandwidth allocated for each wireless backhaul base station in a next first time window is determined, on the basis of the amount of data to be transmitted of each access device in the first time window and a wired backhaul bandwidth.

In an embodiment, when the amount of uplink data to be transmitted of each access device in the first time window is acquired, an available backhaul bandwidth of each wireless backhaul base station may be determined on the basis of a ratio of an amount of uplink data to be transmitted of each wireless backhaul base station to a total amount of uplink data to be transmitted. For example, a wired backhaul bandwidth of a wired backhaul base station is 1 GB/s; access devices of a wired backhaul base station include a user equipment 1, a user equipment 2, a wireless backhaul base station 1 and a wireless backhaul base station 2. The amount of uplink data to be transmitted of the user equipment 1 is 12 bits, the amount of uplink data to be transmitted of the user equipment 2 is 8 bits, the amount of uplink data to be transmitted of the wireless backhaul base station 1 is 24 bits, and the amount of uplink data to be transmitted of a wireless backhaul base station 2 is 36 bits, then an available backhaul bandwidth of 0.3 GB/s may be allocated for the wireless backhaul base station 1, and an available backhaul bandwidth of 0.45 GB/s may be allocated for a wireless backhaul base station 2. When the amount of downlink data to be transmitted of each access device in the first time window is acquired, the available downlink bandwidth may be allocated for each wireless backhaul base station.

In an embodiment, a wired backhaul bandwidth may be a total wired backhaul bandwidth of a wired backhaul base station. In an embodiment, a wired backhaul bandwidth may also be an available wired backhaul bandwidth of a wired backhaul base station, that is, a wired backhaul bandwidth that remains after reserving a certain wired bandwidth for other access devices that are possibly accessed from the total wired backhaul bandwidth of the wired backhaul base station.

In an embodiment, a flow for determining an available uplink backhaul bandwidth allocated for each wireless backhaul base station in the next first time window may refer to the embodiment shown in FIG. 2. In an embodiment, a flow for determining an available uplink backhaul bandwidth allocated for each wireless backhaul base station in the next first time window may refer to the embodiment shown in FIG. 3.

In an exemplary scenario, as shown in FIG. 1C, a wireless backhaul base station 10 (there may be a plurality of wireless backhaul base stations accessing a wired backhaul base station 20), the wired backhaul base station 20, a user equipment 30 (which is a user equipment accessing the wireless backhaul base station 10), a user equipment 40 (which is a user equipment accessing the wired backhaul base station 20), and a core network device 50 are included. Among them the wired backhaul base station 20 may acquire the amount of uplink data to be transmitted of the access device (such as the wireless backhaul base station 10, the user equipment 40) in the first time window, and then an available uplink backhaul bandwidth is allocated for the accessed wireless backhaul base station 10 in the next first time window, and the core network device 50 may send an amount of downlink data to be transmitted of each user equipment to the wired backhaul base station 20, thereby realizing that the wired backhaul base station 20 allocates the available downlink backhaul bandwidth for the accessed wireless backhaul base station 10.

In the present embodiment, through the above mentioned operation 101 to operation 102, a wired backhaul base station may determine an available backhaul bandwidth allocated for each accessed wireless backhaul base station in a next first time window on the basis of an amount of data to be transmitted of each access device in a first time window, to realize that a wired backhaul base station may allocate reasonable bandwidths of an uplink backhaul link and a downlink backhaul link for a wireless backhaul base station on the basis of the amount of the data to be transmitted of the connected wireless backhaul base station, and frequency spectrum resources may be used relatively effectively.

For details on how to adjust a backhaul bandwidth of a wireless backhaul base station, please refer to the subsequent embodiments.

The technical solutions provided by embodiments of the present disclosure will be described with specific embodiments below.

FIG. 2 is a flowchart of another backhaul bandwidth adjusting method illustrated according to an exemplary embodiment. The present embodiment uses the above-mentioned methods provided in the embodiments of the present disclosure, and gives exemplary descriptions by taking an example of allocating an available uplink backhaul bandwidth for a wireless backhaul base station by a wired backhaul base station. As shown in FIG. 2, the following operations are included.

In operation 201, an amount of uplink data to be transmitted reported by each access device in the first time window is received.

In an embodiment, a wired backhaul base station may instruct in advance each access device to report an amount of uplink data to be transmitted in each first time window. The access device reports the amount of uplink data to be transmitted in the first time window on the basis of settings of the wired backhaul base station.

In an embodiment, when a wired backhaul base station needs to acquire the amount of uplink data to be transmitted reported by each access device in the first time window, the wired backhaul base station may further instruct through a signaling each access device to report the amount of uplink data to be transmitted in the first time window.

In operation 202, a total amount of uplink data reported by all access devices in the first time window is determined on the basis of the amount of uplink data to be transmitted reported by each access device in the first time window.

In an embodiment, the total amount of uplink data may be acquired by accumulating the amount of the uplink data to be transmitted reported by each access device in the first time window.

In operation 203, an uplink available backhaul bandwidth of each wireless backhaul base station in the next first time window is determined on the basis of a ratio of an amount of uplink data to be transmitted reported by each wireless backhaul base station in the first time window to the total amount of uplink data and the wired backhaul bandwidth.

In an embodiment, in operation 202 and operation 203, assuming that a wired backhaul bandwidth of a wired backhaul base station is 1 GB/s, access devices of the wired backhaul base station include a user equipment 1, a user equipment 2, a wireless backhaul base station 1 and a wireless backhaul base station 2, the amount of uplink data to be transmitted of the user equipment 1 is 12 bits, the amount of uplink data to be transmitted of the user equipment 2 is 8 bits, the amount of the uplink data to be transmitted of the wireless backhaul base station 1 is 24 bits, and the amount of the uplink data to be transmitted of the wireless backhaul base station 2 is 36 bits, then the total amount of the uplink data may be calculated to be 80 bits, the ratio of the amount of the data to be transmitted of the wireless backhaul base station 1 to the total amount of the uplink data is 0.3, and then the uplink available backhaul bandwidth of 0.3 GB/s may be allocated for the wireless backhaul base station 1; the ratio of the amount of the data to be transmitted of the wireless backhaul base station 2 to the total amount of the uplink data is 0.45, and then the uplink available backhaul bandwidth of 0.45 GB/s may be allocated for the wireless backhaul base station 2.

In the present embodiment, a wired backhaul base station may set a time window in which the amount of the uplink data to be transmitted is reported for each access device, so as to determine the total amount of the uplink data to be transmitted in the next time window, thereby specifically allocating a reasonable backhaul bandwidth for each wireless backhaul base station.

FIG. 3 is a flowchart of one more backhaul bandwidth adjusting method illustrated according to an exemplary embodiment. The present embodiment uses the above-mentioned methods provided in the embodiments of the present disclosure, and gives exemplary descriptions by taking examples of allocating an available downlink backhaul bandwidth for a wireless backhaul base station by a wired backhaul base station. As shown in FIG. 3, the following operations are included.

In operation 301, an amount of downlink data to be transmitted of each user equipment sent by a core network device in a first time window is received.

In an embodiment, the first time window in which the core network device sends the amount of the downlink data to be transmitted of each user equipment and the first time window in which each access device reports the amount of downlink data to be transmitted may be different, and there is a correlation between the two windows.

In an embodiment, the core network device may periodically send the amount of the downlink data to be transmitted of each user equipment to a wired backhaul bandwidth, such as send an amount of downlink data to be transmitted once every 1 ms. In an embodiment, when the amount of downlink data to be transmitted of some user equipment is far greater than and continues for a period of time to be greater than the amount of downlink data to be transmitted of the other user equipment, the core network device may also send the amount of downlink data to be transmitted to a wired backhaul base station, so that the wired backhaul bandwidth adjusts a downlink backhaul bandwidth of each access device.

In operation 302, an amount of downlink data to be transmitted of each access device in the first time window is determined on the basis of the amount of downlink data to be transmitted of each user equipment and a base station accessed by each user equipment.

In an embodiment, what a wired backhaul base station receives is the amount of the downlink data to be transmitted of each user equipment. For example, the amount of the downlink data to be transmitted of a user equipment 1 to a user equipment 8, and the respectively base stations accessed by a wired backhaul base station on the basis of the user equipment 1 to the user equipment 8, determine the amount of the downlink data to be transmitted of each user equipment in the first time window. For example, the user equipment 1 and the user equipment access the wired backhaul base station, the user equipment 3 to 5 access the wireless backhaul base station 1, and the user equipment 6 to 8 access the wireless backhaul base station 2, thereby the amount of the downlink data to be transmitted of each access device (including the user equipment 1, the user equipment 2, the wireless backhaul base station 1, and the wireless backhaul base station 2) may be calculated.

In operation 303, a total amount of downlink data of all access devices in the first time window is determined on the basis of the amount of downlink data to be transmitted of each access device in the first time window.

In operation 304, a downlink available backhaul bandwidth of each wireless backhaul base station is determined on the basis of a wired backhaul bandwidth and a ratio of an amount of downlink data to be transmitted of each wireless backhaul base station in the first time window to the total amount of downlink data.

In an embodiment, descriptions of operation 303 and operation 304 may refer to the descriptions describing methods for determining an uplink available backhaul bandwidth in operation 202 and operation 203 in the embodiments shown in FIG. 2, which will not be detailed herein.

In the present embodiment, the core network device may send the amount of the downlink data to be transmitted of each user equipment, so that the wired backhaul base station determines the total amount of the downlink data to be transmitted in the next time window, thereby specifically allocating a reasonable available downlink backhaul bandwidth for each wireless backhaul base station.

Figure 4:
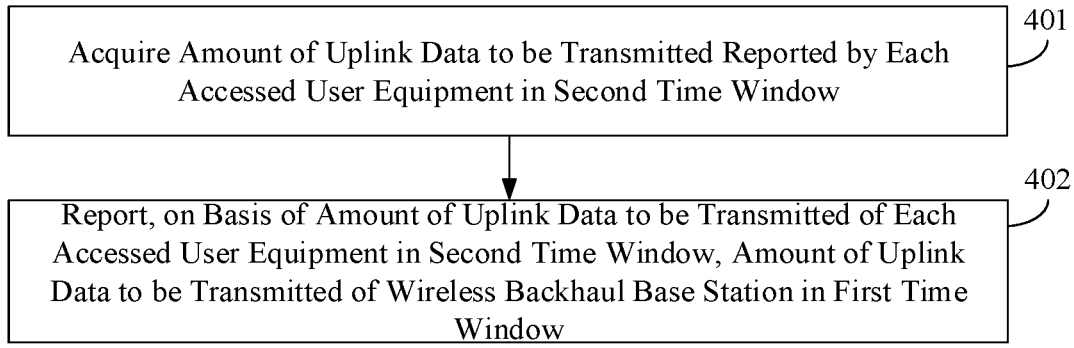
FIG. 4 is a flowchart of a backhaul bandwidth adjusting method illustrated according to an exemplary embodiment.

FIG. 4 is a flowchart of a backhaul bandwidth adjusting method illustrated according to an exemplary embodiment. The backhaul bandwidth adjusting method of the present embodiment may be applied to a wireless backhaul base station. As shown in FIG. 4, the backhaul bandwidth adjusting method includes the following operations 401 to 402.

In operation 401, an amount of uplink data to be transmitted reported by each accessed user equipment in a second time window is acquired.

In an embodiment, the length of the second time window may be a fixed time, such as 1 ms. A first time window may also be a time unit in a logical sense, such as 1 subframe, 1 slot and the like.

In an embodiment, the length of a first time window and the length of the second time window may be the same, and may also be different. Both the first time window and the second time window may be set by a wired backhaul base station.

In operation 402, an amount of uplink data to be transmitted of the wireless backhaul base station is reported in a first time window on the basis of the amount of uplink data to be transmitted of each accessed user equipment in the second time window.

In an embodiment, received amounts of uplink data to be transmitted reported by all user equipment in the second time window are cumulatively calculated, and the resulting accumulated value may be used as the reported amount of uplink data to be transmitted of the wireless backhaul base station in the first time window.

In the present embodiment, each wireless backhaul small cell may determine an amount of uplink data to be transmitted that needs to be reported to a wired backhaul small cell on the basis of an amount of uplink data to be transmitted of each accessed user equipment. The second time window of each accessed user equipment for reporting the amount of uplink data to be transmitted may be set by a wired backhaul base station, so that the time of a wired backhaul base station for counting the amount of data to be transmitted of each access device is relatively consistent, and the backhaul bandwidth allocated for each accessed wireless backhaul base station is relatively reasonable.

Figure 5:
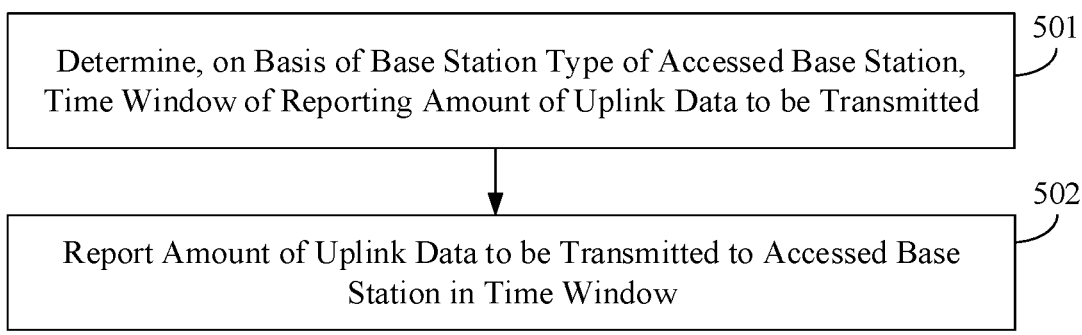
FIG. 5 is a flowchart of a backhaul bandwidth adjusting method illustrated according to an exemplary embodiment.

FIG. 5 is a flowchart of a backhaul bandwidth adjusting method illustrated according to an exemplary embodiment. The backhaul bandwidth adjusting method of the present embodiment may be applied to a user equipment. As shown in FIG. 5, the backhaul bandwidth adjusting method includes the following operations 501 to 502.

In operation 501, a time window of reporting an amount of uplink data to be transmitted is determined on the basis of a base station type of an accessed base station.

In an embodiment, if the base station type of the base station accessed by the user equipment is a base station with a wired backhaul capability, then the time window of reporting the amount of uplink data to be transmitted is determined as a first time window.

In an embodiment, if the base station type of the accessed base station is a wireless backhaul small cell with a wireless backhaul capability, then the time window of reporting the amount of uplink data to be transmitted is determined as a second time window.

In an embodiment, both the first time window and the second time window may be set by a wired backhaul base station.

In an embodiment, a wired backhaul base station may report through signaling broadcast the type of the access base station and report the time window of the amount of uplink data to be transmitted. When the user equipment monitors the signaling, the time window may be determined on the basis of the base station type of the base station accessed by the user equipment.

In operation 502, the amount of uplink data to be transmitted is reported to the accessed base station in the time window.

In the present embodiment, each user equipment may report the amount of uplink data to be transmitted on the basis of the base station type of the base station accessed by each user equipment, and the time window is set by a wired backhaul base station, so that the time of a wired backhaul base station for counting the amount of the data to be transmitted of each access device is relatively consistent, and the backhaul bandwidth allocated for each accessed wireless backhaul base station is relatively reasonable.

Figure 6:
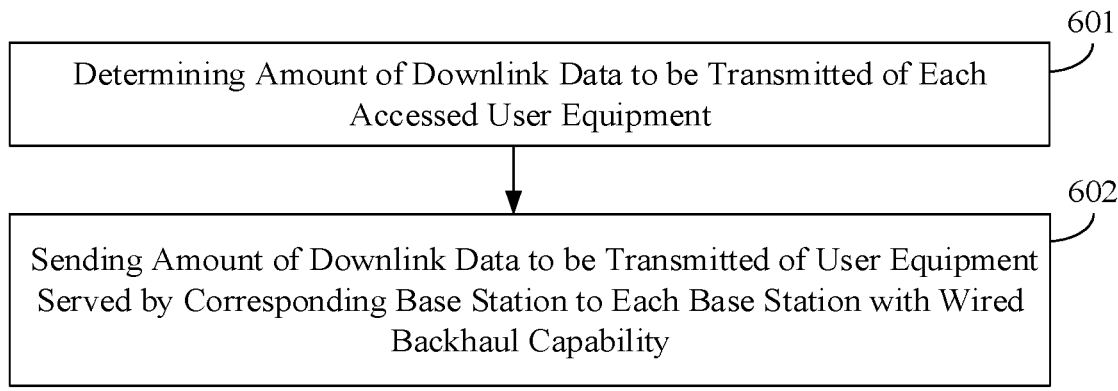
FIG. 6 is a flowchart of a backhaul bandwidth adjusting method illustrated according to an exemplary embodiment.

FIG. 6 is a flowchart of a backhaul bandwidth adjusting method illustrated according to an exemplary embodiment. The backhaul bandwidth adjusting method of the present embodiment may be applied to a core network device. As shown in FIG. 6, the backhaul bandwidth adjusting method includes the following operations 601 to 602.

In operation 601, an amount of downlink data to be transmitted of each accessed user equipment is determined.

In an embodiment, the amount of downlink data to be transmitted of each accessed user equipment may be obtained on the basis of caching data in a cache.

In operation 602, an amount of downlink data to be transmitted of a user equipment served by a corresponding base station service is sent to each base station with a wired backhaul capability.

In an embodiment, the core network device may periodically send an amount of downlink data to be transmitted of each user equipment to a wired backhaul bandwidth, such as sending an amount of downlink data to be transmitted once every 1 ms. In an embodiment, when the amount of downlink data to be transmitted of some user equipment is far greater than and continues for a period of time to be greater than the amount of downlink data to be transmitted in the other user equipment, the core network device may also send the amount of downlink data to be transmitted to a wired backhaul base station, so that the wired backhaul bandwidth adjusts a downlink backhaul bandwidth of each access device.

In the present embodiment, the core network device may send the amount of the downlink data to be transmitted of each user equipment, so that the wired backhaul base station determines the total amount of the downlink data to be transmitted in the next time window, thereby specifically allocating a reasonable available downlink backhaul bandwidth for each wireless backhaul base station.

Figure 7:
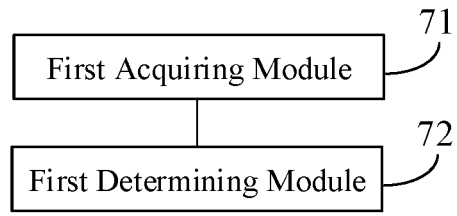
FIG. 7 is a block diagram of a backhaul bandwidth adjusting apparatus illustrated according to an exemplary embodiment.

FIG. 7 is a block diagram of a backhaul bandwidth adjusting apparatus illustrated according to an exemplary embodiment. The backhaul bandwidth adjusting apparatus is applied to a wired backhaul base station. As shown in FIG. 7, the backhaul bandwidth adjusting apparatus includes:

a first acquiring module 71, configured to acquire an amount of data to be transmitted of each access device in a first time window, and the access device including an accessed user equipment and a wireless backhaul base station; and a first determining module 72, configured to determine an available backhaul bandwidth allocated for each wireless backhaul base station in a next first time window on the basis of the amount of data to be transmitted of each access device in the first time window acquired by the first acquiring module 71 and a wired backhaul bandwidth.

In this embodiment, a wired backhaul base station may determine an available backhaul bandwidth allocated for each accessed wireless backhaul base station in the next first time window on the basis of the amount of data to be transmitted of each access device in a first time window, to realize that a wired backhaul base station may allocate reasonable bandwidths of an uplink backhaul link and a downlink backhaul link for a wireless backhaul base station on the basis of the amount of data to be transmitted of the connected wireless backhaul base station, and frequency spectrum resources may be used relatively effectively.

Figure 8:
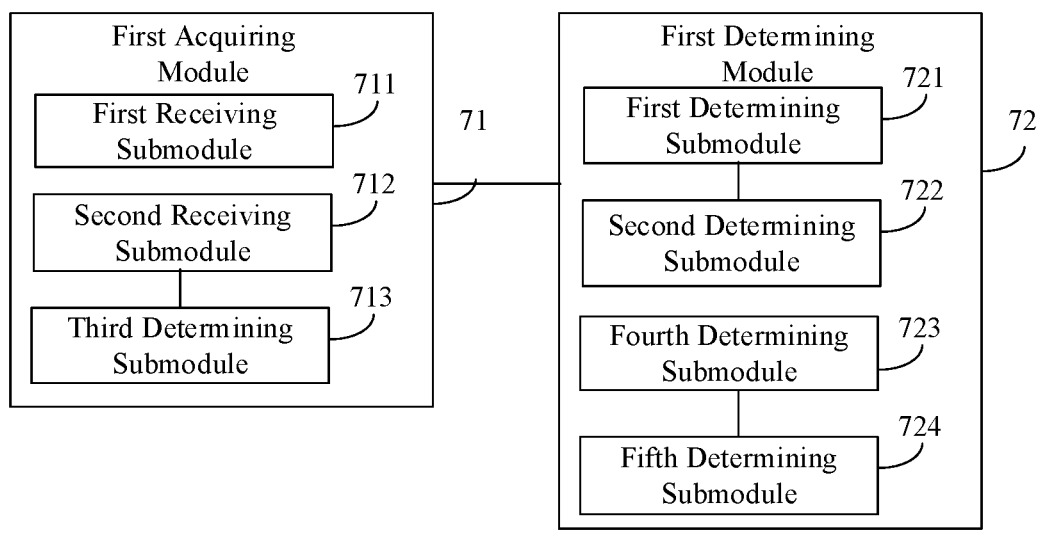
FIG. 8 is a block diagram of another backhaul bandwidth adjusting apparatus illustrated according to an exemplary embodiment.

FIG. 8 is a block diagram of another backhaul bandwidth adjusting apparatus illustrated according to an exemplary embodiment. As shown in FIG. 8, on the basis of the embodiments shown in the above-mentioned FIG. 7, in an embodiment, the first acquiring module 71 includes:

a first receiving sub-module 711, configured to receive an amount of uplink data to be transmitted reported by each access device in the first time window.

In this embodiment, a wired backhaul base station may set a time window in which the amount the uplink data to be transmitted by each access device is reported, so that the time window in which the amount of uplink data to be transmitted is reported by each access base station is consistent, thereby a backhaul bandwidth may be accurately and reasonably allocated for each wireless backhaul base station.

In an embodiment, the first determining module 72 includes:

a first determining sub-module 721, configured to determine a total amount of uplink data reported by all access devices in the first time window on the basis of the amount of uplink data to be transmitted reported by each access device in the first time window; and a second determining sub-module 722, configured to determine an uplink available backhaul bandwidth for each wireless backhaul base station in the next first time window on the basis of a ratio of an amount of uplink data to be transmitted reported by each wireless backhaul base station in the first time window to the total amount of the uplink data and a wired backhaul bandwidth.

In this embodiment, through that an uplink available bandwidth of each wireless backhaul base station is determined on the basis of the ratio of the amount of uplink data to be transmitted of each wireless backhaul base station to the total amount of the uplink data, an available wired bandwidth may be reasonably allocated for each access device.

In an embodiment, the first acquiring module 71 includes:

a second receiving sub-module 712, configured to receive an amount of downlink data to be transmitted of each user equipment sent by a core network device in the first time window; and a third determining sub-module 713, configured to determine an amount of downlink data to be transmitted of each access device in the first time window on the basis of the amount of downlink data to be transmitted of each user equipment and a base station accessed by each user equipment.

In this embodiment, the core network device may send the amount of downlink data to be transmitted of each user equipment, so that a wired backhaul base station determines the total amount of downlink data to be transmitted in the next time window.

In an embodiment, the first determining module 72 includes:

a fourth determining sub-module 723, configured to determine a total amount of downlink data to be transmitted of all access devices in the first time window on the basis of the amount of downlink data to be transmitted of each access device in the first time window; and a fifth determining sub-module 724, configured to determine a downlink available backhaul bandwidth of each wireless backhaul base station on the basis of a wired backhaul bandwidth and a ratio of an amount of downlink data to be transmitted of each wireless backhaul base station in the first time window to the total amount of the downlink data.

In this embodiment, through that a downlink available bandwidth of each wireless backhaul base station is determined on the basis of the ratio of the amount of downlink data to be transmitted of each wireless backhaul base station to the total amount of the downlink data, an available wired bandwidth may be reasonably allocated for each access device.

Figure 9:
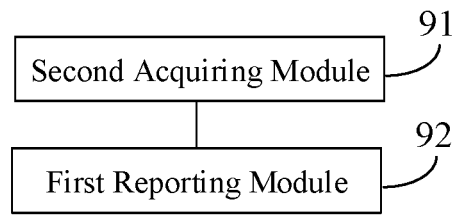
FIG. 9 is a block diagram of a backhaul bandwidth adjusting apparatus illustrated according to an exemplary embodiment.

FIG. 9 is a block diagram of a backhaul bandwidth adjusting apparatus illustrated according to an exemplary embodiment. The backhaul bandwidth adjusting apparatus is applied to a wireless backhaul base station. As shown in FIG. 9, the backhaul bandwidth adjusting apparatus includes:

a second acquiring module 91, configured to acquire an amount of uplink data to be transmitted reported by each accessed user equipment in a second time window; and a first reporting module 92, configured to report an amount of uplink data to be transmitted of the wireless backhaul base station in a first time window, on the basis of the amount of uplink data to be transmitted of each accessed user equipment in the second time window.

In an embodiment, both the first time window and the second time window are set by a wired backhaul base station accessed by a wireless backhaul base station.

In this embodiment, each wireless backhaul small cell may determine an amount of uplink data to be transmitted that needs to be reported to a wired backhaul small cell on the basis of the amount of uplink data to be transmitted of each accessed user equipment. The second time window of each accessed user equipment for reporting the amount of uplink data to be transmitted may be set by a wired backhaul base station, so that the time for the wired backhaul base station to count the amount of data to be transmitted of each access device is relatively consistent, and the backhaul bandwidth allocated for each accessed wireless backhaul base station is relatively reasonable.

Figure 10:
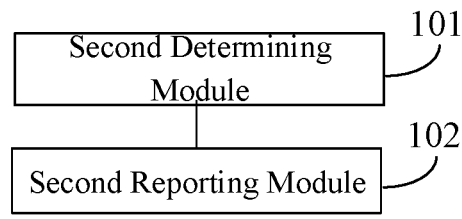
FIG. 10 is a block diagram of a backhaul bandwidth adjusting apparatus illustrated according to an exemplary embodiment.

FIG. 10 is a block diagram of a backhaul bandwidth adjusting apparatus illustrated according to an exemplary embodiment. The backhaul bandwidth adjusting apparatus is applied to a user equipment. As shown in FIG. 10, the backhaul bandwidth adjusting apparatus includes:

a second determining module 101, configured to determine a time window of reporting an amount of uplink data to be transmitted, on the basis of a base station type of an accessed base station; and a second reporting module 102, configured to report the amount of uplink data to be transmitted to the accessed base station in the time window.

In this embodiment, each user equipment may report the amount of uplink data to be transmitted on the basis of a base station type of a base station accessed by each user equipment, and the time window is set by a wired backhaul base station, so that the time for a wired backhaul base station to count the amount of the data to be transmitted of each access device is relatively consistent, and the backhaul bandwidth allocated for each accessed wireless backhaul base station is relatively reasonable.

Figure 11:
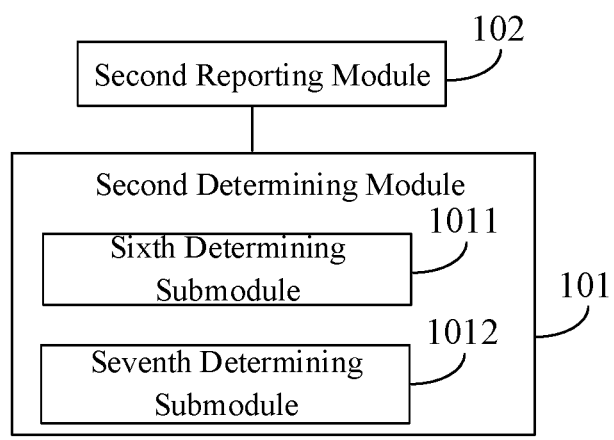
FIG. 11 is a block diagram of another backhaul bandwidth adjusting apparatus illustrated according to an exemplary embodiment.

FIG. 11 is a block diagram of another backhaul bandwidth adjusting apparatus illustrated according to an exemplary embodiment. As shown in FIG. 11, on the basis of the embodiment shown in the above-mentioned FIG. 10, in an embodiment, the second determining module 101 includes:

a sixth determining sub-module 1011, configured to determine the time window of reporting the amount of uplink data to be transmitted as a first time window when the base station type of the base station accessed by the user equipment is a base station with a wired backhaul capability; and a seventh determining sub-module 1012, configured to determine the time window of reporting the amount of uplink data to be transmitted as a second time window when the base station type of the accessed base station is a wireless backhaul small cell with wireless backhaul capability.

In an embodiment, both the first time window and the second time window are set by a wired backhaul base station.

In this embodiment, the type of base station accessed by each user equipment is different, and the time window of reporting may be different, but the time window for each access device of a wired backhaul base station to report is the same, so that the time for counting the amount of data to be transmitted of each access device is relatively consistent, and the backhaul bandwidth allocated for each accessed wireless backhaul base station is relatively reasonable.

Figure 12:
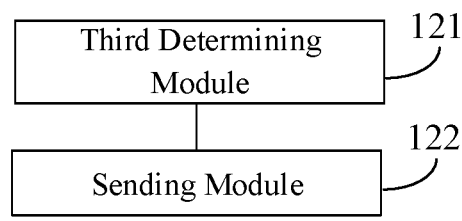
FIG. 12 is a block diagram of a backhaul bandwidth adjusting apparatus illustrated according to an exemplary embodiment.

FIG. 12 is a block diagram of a backhaul bandwidth adjusting apparatus illustrated according to an exemplary embodiment. The backhaul bandwidth adjusting apparatus is applied to a core network device. As shown in FIG. 12, the backhaul bandwidth adjusting apparatus includes:

a third determining module 121, configured to determine an amount of downlink data to be transmitted of each accessed user equipment; and a sending module 122, configured to send an amount of downlink data to be transmitted of a user equipment served by a corresponding base station to each base station with a wired backhaul capability.

In this embodiment, the core network device may send the amount of downlink data to be transmitted of each user equipment, so that a wired backhaul base station determines a total amount of downlink data to be transmitted in the next time window, thereby specifically allocating a reasonable available downlink backhaul bandwidth for each wireless backhaul base station.

Figure 13:
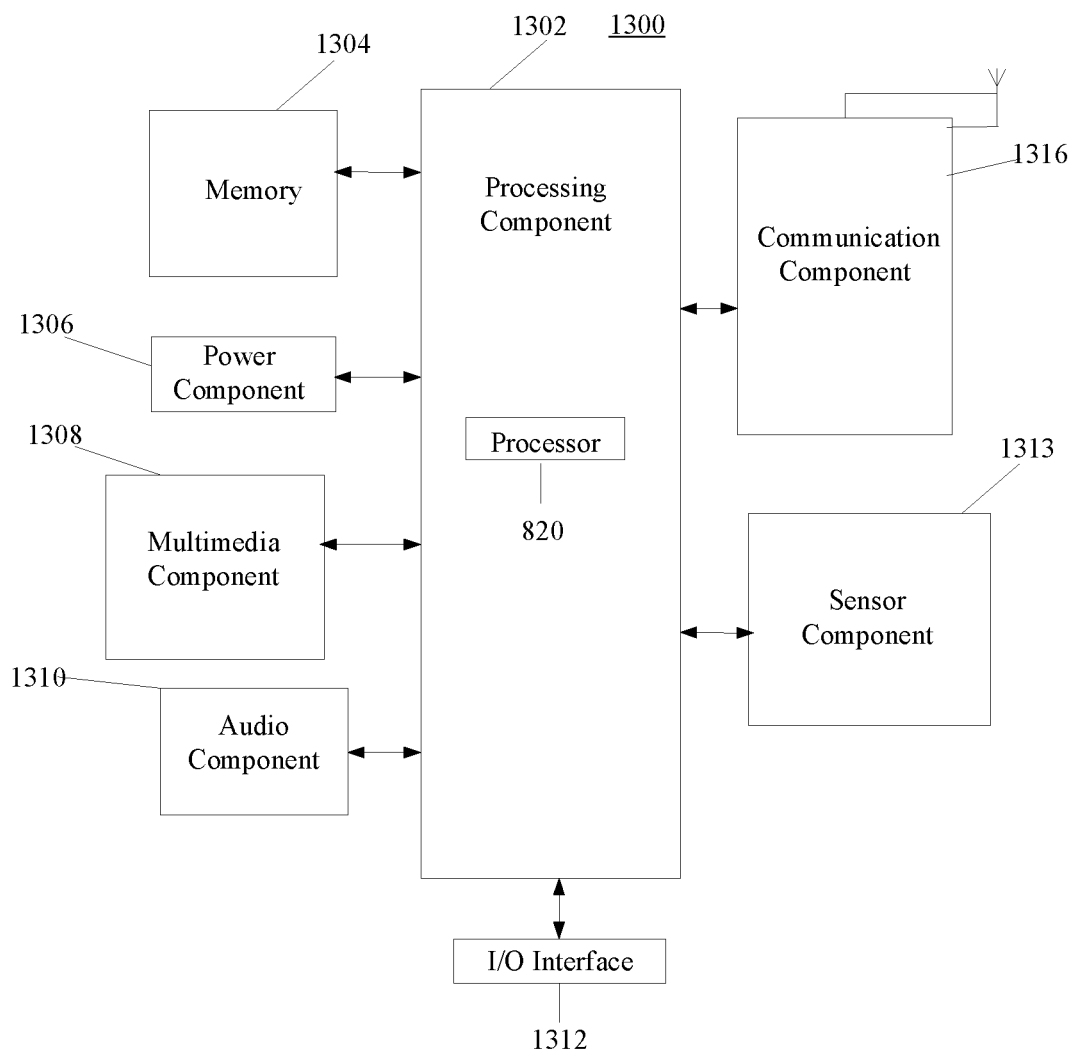
FIG. 13 is a block diagram applied to a backhaul bandwidth adjusting apparatus illustrated according to an exemplary embodiment.

FIG. 13 is a block diagram applied to a backhaul bandwidth adjusting apparatus illustrated according to an exemplary embodiment. For example, the apparatus 1300 may be a user equipment, such as a smartphone.

Referring to FIG. 13, the apparatus 1300 may include one or more of the following components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls overall operations of the apparatus 1300, such as operations associated with displays, telephone calls, data communication, camera operations, and recording operations. The processing component 1302 may include one or more processors 1320 for executing instructions, to complete all or part of the operations of the above-mentioned method. Moreover, the processing component 1302 may include one or more modules, to facilitate interactions between the processing component 1302 and other components. For example, the processing component 1302 may include a multimedia module, to facilitate interactions between the multimedia component 1308 and the processing component 1302.

The memory 1304 is configured to store various types of data to support operations on the apparatus 1300. Examples of such data include instructions, messages, pictures and the like used for any application program or method operated on the apparatus 1300. The memory 1304 may be realized by any type of volatile or non-volatile memory device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power supply component 1306 provides electric power to various components of the apparatus 1300. The power supply component 1306 may include a power management system, one or more power supplies, and other components associated with generating, managing, and distributing electric power for the apparatus 1300.

The multimedia component 1308 includes a screen that provides an output interface between the apparatus 1300 and a user. In some embodiments, the screen may include a Liquid Crystal Display (LCD) and a Touch Panel (TP). If the screen includes a touch panel, the screen may be realized as a touch screen, to receive an input signal from the user. The touch panel includes one or more touch sensors to sense touch, slide, and gestures on the touch panel. The touch sensor may not only sense the boundary of a touch or slide action, but also detect duration and pressure related to the touch or slide operation. In some embodiments, the multimedia component 1308 includes a front camera and/or a rear camera. When the apparatus 1300 is in an operation mode, such as a shooting mode or a video mode, the front camera and/or the rear camera may receive external multimedia data. Each front camera and rear camera may be a fixed optical lens system or have focal and optical zoom capabilities.

The audio component 1310 is configured to output and/or input audio signals. For example, the audio component 1310 includes a microphone (MIC). When the apparatus 1300 is in an operation mode, such as a call mode, a recording mode, and a voice recognition mode, the microphone is configured to receive external audio signals. The received audio signal may be further stored in the memory 1304 or sent via the communication component 1316. In some embodiments, the audio component 1310 further includes a loudspeaker for outputting audio signal.

The I/O interface 1312 provides an interface between the processing component 1302 and a peripheral interface module. The above-mentioned peripheral interface module may be a keyboard, a click wheel, a button and the like. These buttons may include, but are not limited to: homepage button, volume button, play button and lock button.

The sensor component 1314 includes one or more sensors for providing state evaluations of various aspects for the apparatus 1300. For example, the sensor component 1314 may detect an on/off state of the apparatus 1300 and relative positioning of the components, such as components of a displayer and a keypad of the apparatus 1300. The sensor component 1314 may also detect a position change of the apparatus 1300 or a component of the apparatus 1300, presence or absence of a contact of the user and the apparatus 1300, an orientation or acceleration/deceleration of the apparatus 1300, and a temperature change of the apparatus 1300. The sensor component 1314 may include a proximity sensor, configured to detect presence of nearby objects without any physical contact. The sensor component 1314 may further include a light sensor, such as a CMOS or CCD image sensor, for using in imaging applications. In some embodiments, the sensor component 1314 may further include an acceleration sensor, a gyroscope sensor, a magnetic sensor, a distance sensor, a pressure sensor, or a temperature sensor.

The communication component 1316 is configured to facilitate wired or wireless communication between the apparatus 1300 and other devices. The apparatus 1300 may access wireless networks based on communication standards, such as WIFI, 2G or 3G, or a combination thereof. In an exemplary embodiment, the communication component 1316 receives broadcast signals or broadcast-related information from an external broadcast management system via a broadcast channel. In an exemplary embodiment, the communication component 1316 further includes a Near Field Communication (NFC) module, to promote short range communication. For example, the NFC module may be realized based on Radio Frequency Identification (RFID) technology, Infrared Data Association (IrDA) technology, Ultra-Wide Band (UWB) technology, Bluetooth (BT) technology and other technologies.

In exemplary embodiments, the apparatus 1300 may be realized by one or more Application Specific Integrated Circuits (ASIC), Digital Signal Processors (DSP), Digital Signal Processing Devices (DSPD), Programmable Logic Devices (PLD), and Field Programmable Gate Arrays (FPGA), controllers, micro-controllers, micro-processors, or other electronic elements, for performing the overheating protection method of the above mentioned user equipment.

In exemplary embodiments, a non-temporary computer-readable storage medium including instructions is provided, such as a memory 1304 including instructions, and the above-mentioned instructions may be executed by the processor 1320 of the apparatus 1300 to complete the above-mentioned method. For example, the non-temporary computer-readable storage medium may be a ROM, a Random Access Memory (RAM), a CD-ROM, a magnetic tape, a floppy disk, and an optical data memory device and the like.

A non-temporary computer-readable storage medium, when instructions in the storage medium are executed by the processor of the apparatus, enables the apparatus to execute the backhaul bandwidth adjusting method of the above-mentioned third aspect. The method includes:

determining a time window of reporting an amount of uplink data to be transmitted, on the basis of a base station type of an accessed base station; and reporting the amount of uplink data to be transmitted to the accessed base station in the time window.

Figure 14:
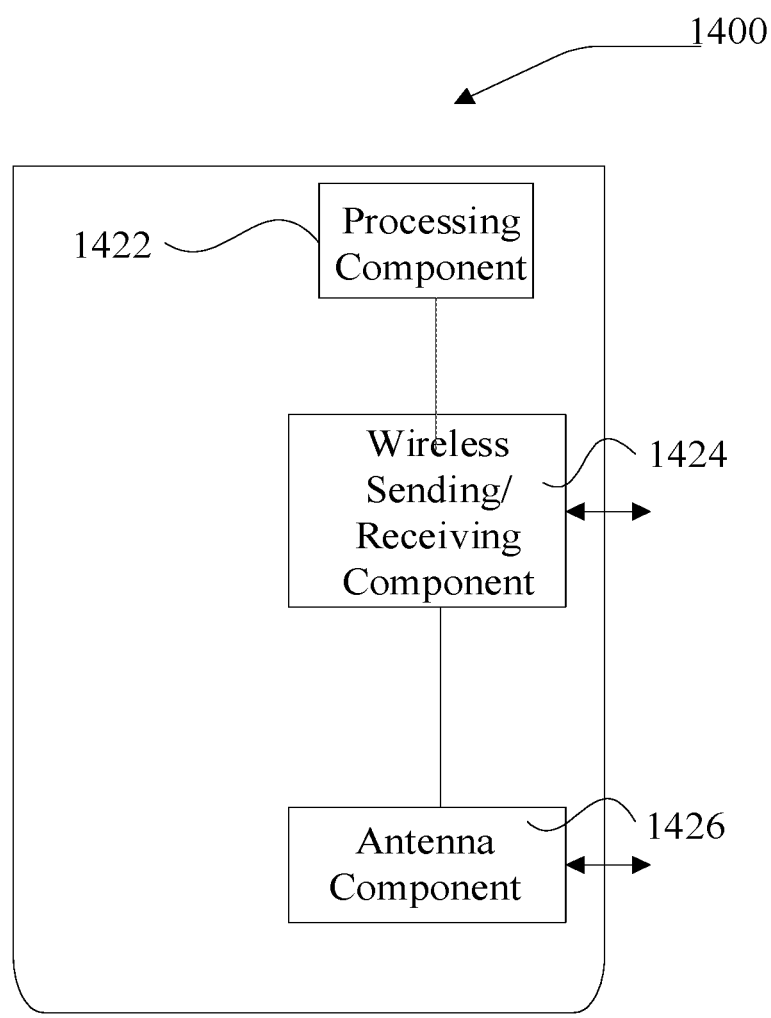
FIG. 14 is a block diagram applied to a backhaul bandwidth adjusting apparatus illustrated according to an exemplary embodiment.

FIG. 14 is a block diagram suitable for a data sending apparatus illustrated according to an exemplary embodiment. The apparatus 1400 may be provided as a base station. Referring to FIG. 14, the apparatus 1400 includes a processing component 1422, a wireless sending/receiving component 1424, an antenna component 1426, and a signal processing portion unique to a wireless interface. The processing component 1422 may further include one or more processors.

When the apparatus is a wireless backhaul base station, one of the processors in the processing component 1422 may be configured to execute the backhaul bandwidth adjusting method described in the second aspect above mentioned.

When the apparatus is a wireless backhaul base station, one of the processors in the processing component 1422 may be configured to execute the backhaul bandwidth adjusting method described in the first aspect above mentioned.

When the apparatus is a core network device, one of the processors in the processing component 1422 may be configured to execute the backhaul bandwidth adjusting method described in the fourth aspect above mentioned.

In exemplary embodiments, a non-temporary computer-readable storage medium including instructions is further provided, and the above-mentioned instructions may be executed by the processing component 1422 of the apparatus 1400 to complete the above-mentioned methods described in the first aspect, the second aspect and the fourth aspect. For example, the non-temporary computer-readable storage medium may be a ROM, a Random Access Memory (RAM), a CD-ROM, a magnetic tape, a floppy disk, and an optical data memory device and the like.

After considering the specification and practicing the disclosure disclosed herein, those skilled in the art will easily think of other embodiments of the present disclosure. The present application is intended to cover any variations, uses, or adaptive changes of the present disclosure. These variations, uses, or adaptive changes are in accordance with general principles of the present disclosure and include common general knowledge or conventional technical means in the art that are not disclosed in the present disclosure. The specification and the embodiments are only regarded as exemplary, and the true scope and spirit of the present disclosure are indicated by the following claims.

It should be understood that the present disclosure is not limited to the precise structure that has been described above and illustrated in the accompanying drawings, and various modifications and changes may be made without departing from the scope thereof. The scope of the present disclosure is limited only by the appended claims.

The invention claimed is:

1. A backhaul bandwidth adjusting method, executed by a wired backhaul base station, the method comprising:
  acquiring an amount of data to be transmitted for each access device among a plurality of access devices in a first time window, the plurality of access devices comprising accessed user equipment and at least one wireless backhaul base station; and
  determining, based on the amount of data to be transmitted for each access device in the first time window and a wired backhaul bandwidth, an available backhaul bandwidth allocated for each wireless backhaul base station in a next first time window, the wired backhaul bandwidth comprising a first wired backhaul bandwidth and a second wired backhaul bandwidth;
  wherein the acquiring an amount of data to be transmitted for each access device among a plurality of access devices in a first time window comprises:
  receiving an amount of uplink data to be transmitted reported by each access device in the first time window;
  wherein the determining, based on the amount of data to be transmitted for each access device in the first time window and the wired backhaul bandwidth, the available backhaul bandwidth allocated for each wireless backhaul base station in the next first time window comprises:
  determining a total amount of uplink data reported by all access devices in the first time window by summing up the amount of uplink data to be transmitted reported by each access device in the first time window; and
  determining an uplink available backhaul bandwidth of each wireless backhaul base station in the next first time window by multiplying the first wired backhaul bandwidth with a first ratio, wherein the first ratio is a ratio of an amount of uplink data to be transmitted reported by each wireless backhaul base station in the first time window to the total amount of only uplink data reported by all access devices in the first time window;

wherein the determining, based on the amount of data to be transmitted for each access device in the first time window and the wired backhaul bandwidth, the available backhaul bandwidth allocated for each wireless backhaul base station in the next first time window comprises:
  determining a total amount of downlink data to be transmitted to all access devices received or determined in the first time window by summing up an amount of downlink data to be transmitted to each access device received or determined in the first time window; and
  determining a downlink available backhaul bandwidth of each wireless backhaul base station by multiplying the second wired backhaul bandwidth with a second ratio, wherein the second ratio is a ratio of an amount of downlink data to be transmitted to each wireless backhaul base station in the first time window to the total amount of only downlink data to be transmitted to all access devices received or determined in the first time window.

2. The method according to claim 1, wherein the acquiring the amount of data to be transmitted for each access device in the first time window comprises:
  receiving an amount of downlink data to be transmitted to each user equipment sent by a core network device in the first time window; and
  determining, based on the amount of downlink data to be transmitted to each user equipment and a base station accessed by each user equipment, an amount of downlink data to be transmitted to each access device in the first time window.

3. A base station implementing the method according to claim 1, comprising:
  a processor; and
  a memory device for storing instructions executable for execution by the processor;
  wherein the processor is configured to:
  acquire an amount of data to be transmitted for each access device among a plurality of access devices in a first time window, the plurality of access devices comprising an accessed user equipment and at least one wireless backhaul base station; and
  determine, based on the amount of data to be transmitted for each access device in a first time window and a wired backhaul bandwidth, an available backhaul bandwidth allocated for each wireless backhaul base station in a next first time window to implement operations of the method, the wired backhaul bandwidth comprising a first wired backhaul bandwidth and a second wired backhaul bandwidth;
  wherein the processor is further configured to:
  receive an amount of uplink data to be transmitted reported by each access device in the first time window;
  determine a total amount of uplink data reported by all access devices in the first time window by summing up the amount of uplink data to be transmitted reported by each access device in the first time window; and
  determine an uplink available backhaul bandwidth of each wireless backhaul base station in the next first time window by multiplying the first wired backhaul bandwidth with a first ratio, wherein the first ratio is a ratio of an amount of uplink data to be transmitted reported by each wireless backhaul base station in the first time window to the total amount of only uplink data reported by all access devices in the first time window;

wherein the processor is further configured to:
determine a total amount of downlink data to be transmitted to all access devices received or determined in the first time window by summing up an amount of downlink data to be transmitted to each access device received or determined in the first time window; and
determine a downlink available backhaul bandwidth of each wireless backhaul base station by multiplying the second wired backhaul bandwidth with a second ratio, wherein the second ratio is a ratio of an amount of downlink data to be transmitted to each wireless backhaul base station in the first time window to the total amount of only downlink data to be transmitted to all access devices received or determined in the first time window.

4. The base station according to claim 3, wherein the processor is further configured to:
receive an amount of downlink data to be transmitted to each user equipment sent by a core network device in the first time window; and
determine, on the basis of the amount of downlink data to be transmitted to each user equipment and a base station accessed by each user equipment, an amount of downlink data to be transmitted to each access device in the first time window.

5. A communication system implementing the method according to claim 1, comprising the wired backhaul base station and the access device, wherein the wired backhaul base station is configured to determine the available backhaul bandwidth allocated for each accessed wireless backhaul base station in the next first time window based on amount of data to be transmitted for the each access device in the first time window, such that the wired backhaul base station allocates only reasonable bandwidths of an uplink backhaul link and a downlink backhaul link for the wireless backhaul base station based on an amount of data to be transmitted by connected wireless backhaul base station, and frequency spectrum resources are used with improved efficiency;
wherein the wired backhaul base station is further configured to:
determine a total amount of uplink data reported by all access devices in the first time window by summing up the amount of uplink data to be transmitted reported by each access device in the first time window; and
determine an uplink available backhaul bandwidth of each wireless backhaul base station in the next first time window by multiplying a first wired backhaul bandwidth with a first ratio, wherein the first ratio is a ratio of an amount of uplink data to be transmitted reported by each wireless backhaul base station in the first time window to the total amount of only uplink data reported by all access devices in the first time window;
wherein the wired backhaul base station is further configured to:
determine a total amount of downlink data to be transmitted to all access devices received or determined in the first time window by summing up an amount of downlink data to be transmitted to each access device received or determined in the first time window; and
determining a downlink available backhaul bandwidth of each wireless backhaul base station by multiplying a second wired backhaul bandwidth with a second ratio, wherein the second ratio is a ratio of an amount of downlink data to be transmitted to each wireless backhaul base station in the first time window to the total amount of only downlink data to be transmitted to all access devices received or determined in the first time window.

* * * * *